United States Patent [19]
Comte

[11] 4,353,659
[45] Oct. 12, 1982

[54] UMBRELLA LOCKING SLEEVE

[75] Inventor: Pierre Comte, La Tour du Pin, France

[73] Assignee: Societe d'Exploitation Clairitex, Saint Clair de la Tour, France

[21] Appl. No.: 284,992

[22] Filed: Jul. 20, 1981

[30] Foreign Application Priority Data

Jul. 22, 1980 [FR] France ................................ 80 16395

[51] Int. Cl.³ ............................................ A47B 37/04
[52] U.S. Cl. ...................................... 403/24; 108/50; 403/196
[58] Field of Search ..................... 16/108, 109; 108/50; 135/16, DIG. 9; 248/511; 403/192, 24, 194, 195, 196, 197; 273/194 B

[56] References Cited

U.S. PATENT DOCUMENTS

| 1,191,078 | 7/1916 | Hutton | 403/196 X |
| 1,696,288 | 12/1928 | Underwood | 248/511 X |
| 1,787,669 | 1/1931 | Ledbetter | 16/108 X |
| 2,465,844 | 3/1949 | Brushaber | 403/195 X |
| 2,522,172 | 9/1950 | Gates | 403/195 X |
| 2,743,146 | 4/1956 | Wheeler | 108/50 |

FOREIGN PATENT DOCUMENTS

| 324057 | 1/1930 | United Kingdom | 108/50 |
| 946629 | 1/1964 | United Kingdom | 403/197 |

Primary Examiner—Harland S. Skogquist
Attorney, Agent, or Firm—Karl F. Ross

[57] ABSTRACT

A locking sleeve for the post of a shade umbrella or the like comprises a tubular body adapted to be fitted into a hole in a table or other article of furniture and formed with a longitudinal slot allowing outward spreading of the body upon the tightening of a screw threaded therein against the post.

7 Claims, 4 Drawing Figures

U.S. Patent      Oct. 12, 1982      4,353,659
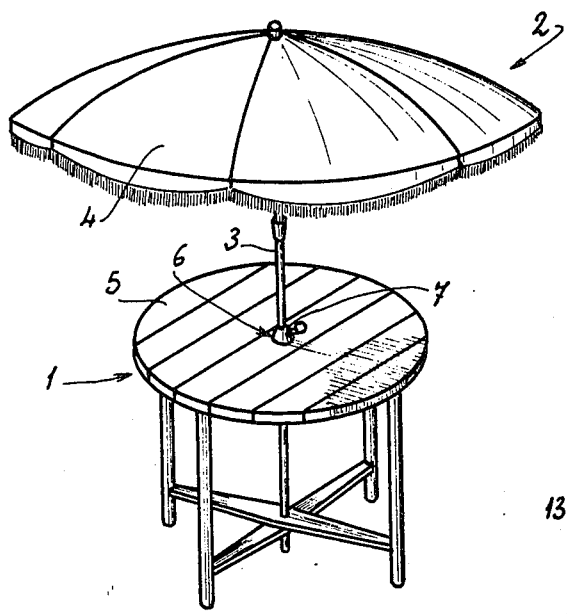
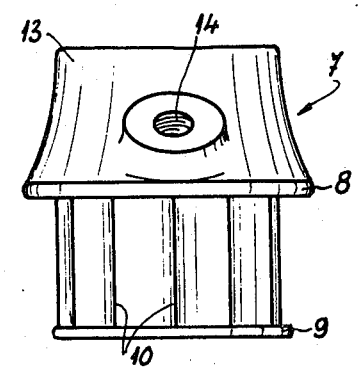
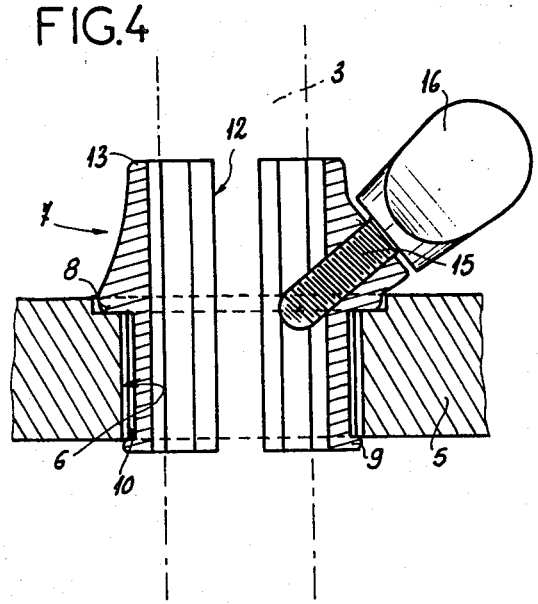
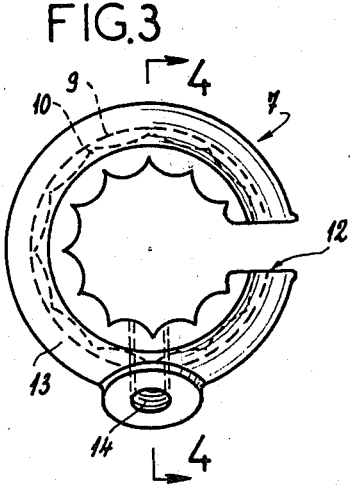

UMBRELLA LOCKING SLEEVE

FIELD OF THE INVENTION

My present invention relates to a locking sleeve for retaining the post of a shade umbrella, parasol or the like in an article of furniture such as an outdoor or patio or garden table, a chaise longue or the like.

BACKGROUND OF THE INVENTION

It is frequently desirable to mount a shade umbrella, parasol or like device, having a pole, post, shank or rod upon an outdoor article of furniture such as a table for garden or patio use.

The post of the umbrella is usually inserted into a hole provided in the table, the post being generally articulated to enable the head of the umbrella to be canted to the remainder of the pole shank at a selected angle affording maximum protection from the sun. However, in the case of wind or other disturbances, this tilted orientation of the umbrella head causes the umbrella to rotate about the vertical axis of the pole shank unless the latter is anchored. To avoid this disadvantage means may be provided to engage the foot of the post to hold the latter in place.

A foot of this type is not generally useful when the table cannot accommodate it, e.g. because the presence of cross pieces or the like without apertures renders the same incapable of receiving the post.

OBJECTS OF THE INVENTION

It is the principal object of the present invention to provide a locking sleeve for locking the post of a shade umbrella or similar implement to an article of furniture such as a table which is capable of preventing rotation of the post.

Another object is to provide a locking device for the latter purpose of substantially general applicability, i.e. capable of use with practically any table or other article of furniture as long as the latter is provided with a hole capable of accommodating the device.

Still another object of the invention is to provide a device for locking the post of a shade umbrella or the like in a hole of an outdoor table which obviates the disadvantages of earlier umbrella mounting systems, is easily manipulated, provides secure positioning of the umbrella post and can be employed with holes of various diameters.

SUMMARY OF THE INVENTION

These objects and others which will become apparent hereinafter are attained in accordance with the invention with a split-locking sleeve formed with a threaded bore whose axis lies in an axial plane of the sleeve, i.e. is generally radial, but is oblique, i.e. inclined upwardly and outwardly with respect to the access of the sleeve.

A screw is threaded into this bore and can bear against an umbrella post inserted into the sleeve so that, when the screw is tightened, the post is clamped in place against the wall of the sleeve opposite the screw and the sleeve simultaneously is spread outwardly to bear upon the wall of the hole, thereby locking the sleeve in place.

The sleeve can thus be formed as an elastically expandable body whose radial slit extends over its entire length and whose axially extending inner passage receives the post while its outer generally cylindrical wall bears upon the wall of the hole. The inner and outer diameters of the sleeve are thus dimensioned respectively to receive the post and to enable the slit to fit within the table hole.

Thus by tightening the screw, the single elements serve simultaneously to anchor the sleeve to the table and retain the post against rotation. To facilitate rotation of the screw, the latter can have a flat head of thumb screw type.

Advantageously the inner and outer walls of the split tubular body are formed with angularly equispaced ribs and/or grooves extending along generatrices thereof and imparting dentate configurations to these walls as seen in cross section, thereby improving the grip of the body against post and table.

Furthermore, the outer dentate region can be defined between a pair of annular shoulders adapted to be juxtaposed with upper and lower surfaces of the table, thereby axially fixing the sleeve relative thereto.

BRIEF DESCRIPTION OF THE DRAWING

The above and other objects, features and advantages of the present invention will become more readily apparent from the following description, reference being made to the accompanying drawing in which:

FIG. 1 is a diagrammatic perspective view of an assembly consisting of a shade umbrella or parasol, locking sleeve and table according to the invention;

FIG. 2 is an elevational view, drawn to a larger scale, of a locking sleeve;

FIG. 3 is a top-plan view of the sleeve; and

FIG. 4 is a section taken along line 4—4 of FIG. 3 showing the sleeve in position in a table.

SPECIFIC DESCRIPTION

As can be seen from FIG. 1, the top 5 of a table 1 can be provided with a hole 6 receiving a locking sleeve 7 according to the invention which retains the post 3 of a shade umbrella 2 having a tilting head 4.

The sleeve 7, which is shown in detail in FIGS. 2-4, has upper and lower outer shoulders 8 and 9 whose axial spacing is slightly greater than the thickness of the table in the region of the hole 6.

The exterior of the sleeve 7 between the shoulders forms a dentate region provided with longitudinally extending sharp ribs 10 separated by grooves and serving to insure effective engagement of this region against the wall of the hole 6, i.e. radially against the table top 5.

The sleeve 7 is also split, i.e. is provided with a radial slit 12 extending the full length of the sleeve and is provided with a thick band 13 along its upper edge.

This thick portion is formed with an internally threaded bore 14 which is generally oriented radially but is oblique to the longitudinal axis of the sleeve.

The bore 14 receives the threaded stem 15 of a thumb screw whose plate-shaped head 16 is disposed above the table top 5 when the sleeve is inserted into the hole 6.

Becuase of the transverse elasticity imparted by the slit 12, the sleeve 7 can easily be inserted into the hole 6 and is retained vertically therein by the upper and lower shoulders 8 and 9.

The post 3 can then be inserted through the sleeve 7 and can slide axially or rotate freely therein because the post diameter is less than the inner diameter of the sleeve. The inner wall of the sleeve is ribbed similarly to the outer wall.

When the head 4 is tilted and the optimum position with respect to the sun is attained, the screw 15, 16 is tightened, thereby clamping it against the post and the latter against the opposite position of the inner wall of the sleeve 7. At the same time the sleeve 7 is spread radially and locked to the table.

The post can have an external configuration or relief which, upon engagement by the screw, prevents rotation of the post if the internal ribs are not provided for this purpose.

The slit 12 can be relatively wide to permit an electrical conductor to be fed therethrough and thus through the hole in the table to energize a lamp or other appliance on the table top. This width should also be sufficient to permit radial compression of the sleeve so as to enable it to fit within the hole 6.

The sleeve 7 can be composed of a molded synthetic resin, e.g. a polyamide such as nylon, or any other material capable of providing the requisite compressive strength and elasticity.

The device can also be formed with internal grooves to reduce the weight and cost of the sleeve.

Additionally, it should be noted that the device need not be used exclusively to mount the umbrella upon a table. It can be employed with any article of furniture provided with a hole to accommodate it, e.g. a chaise longue.

I claim:

1. A locking device for the pole of a shade umbrella, parasol or the like adapted to mount the same upon an article of furniture formed with a hole through which the pole can pass with clearance, said device comprising a split tubular body of an outwardly deformable material adapted to be received in said hole, said body being formed with a throughgoing threaded bore extending generally radially but inclined to the axis of said body, and a screw threaded into said bore and having a head rotatable from a location external of said body whereby rotation of said screw engages said screw against said pole and simultaneously expands said body radially to lock said body in said hole and said pole in said body.

2. The device defined in claim 1 wherein said body is formed with an upper and lower external shoulder axially spaced apart and adapted to be juxtaposed with upper and lower surfaces of said article of furniture.

3. The device defined in claim 2 wherein said article of furniture is a table having a tabletop formed with said hole and with said surfaces, the space between said shoulders being at least equal to the thickness of said tabletop between said shoulders.

4. The device defined in claim 3 wherein said upper shoulder is formed on a thickened portion of said body, said bore being provided in said thickened portion.

5. The device defined in claim 4 wherein said body is provided externally with a plurality of axially extending spaced-apart ribs between said shoulders for seizing the wall of said hole.

6. The device defined in claim 5 wherein said body is provided internally with a plurality of axially extending ribs engageable with said pole.

7. The device defined in claim 1, claim 2, claim 3, claim 4, claim 5 or claim 6 wherein said body is a sleeve formed with a slot extending the full length thereof and forming the split in said body, said slot having a width sufficient, when said body is anchored in said hole, to enable an electrical conductor to pass through said slot and through said hole to energize an electrical appliance upon said article of furniture.

* * * * *